April 10, 1934.  J. E. LAGER  1,954,674
MEANS FOR CULTIVATING PLANTS
Filed April 4, 1932   2 Sheets-Sheet 1
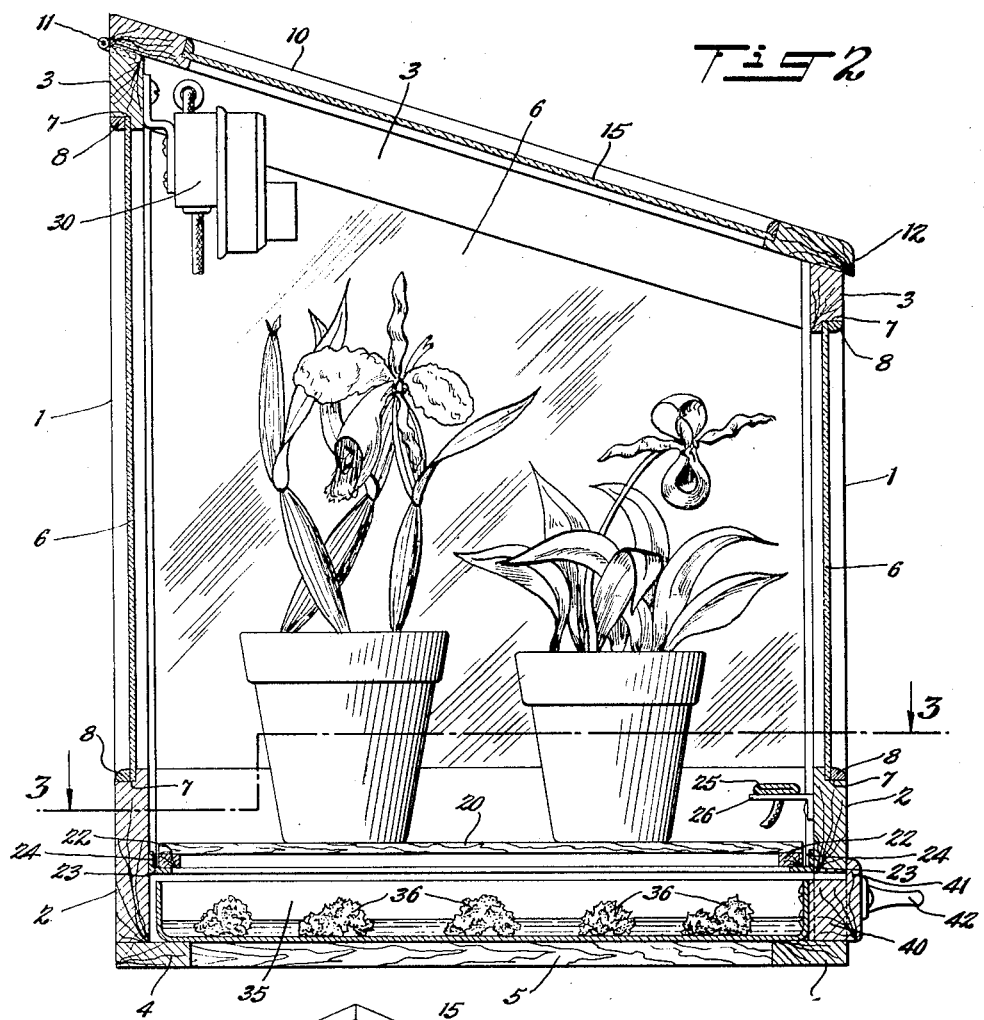
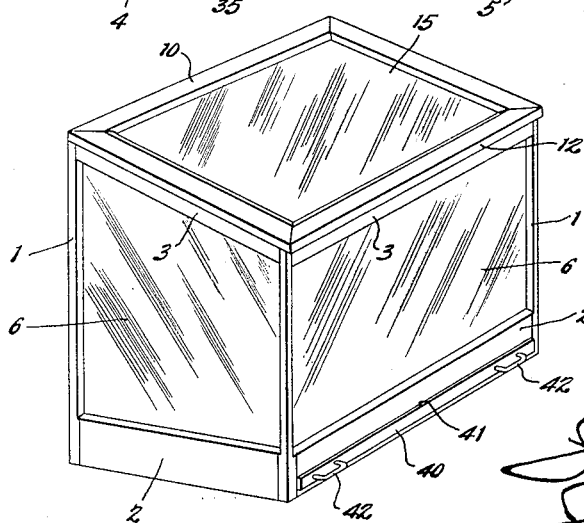

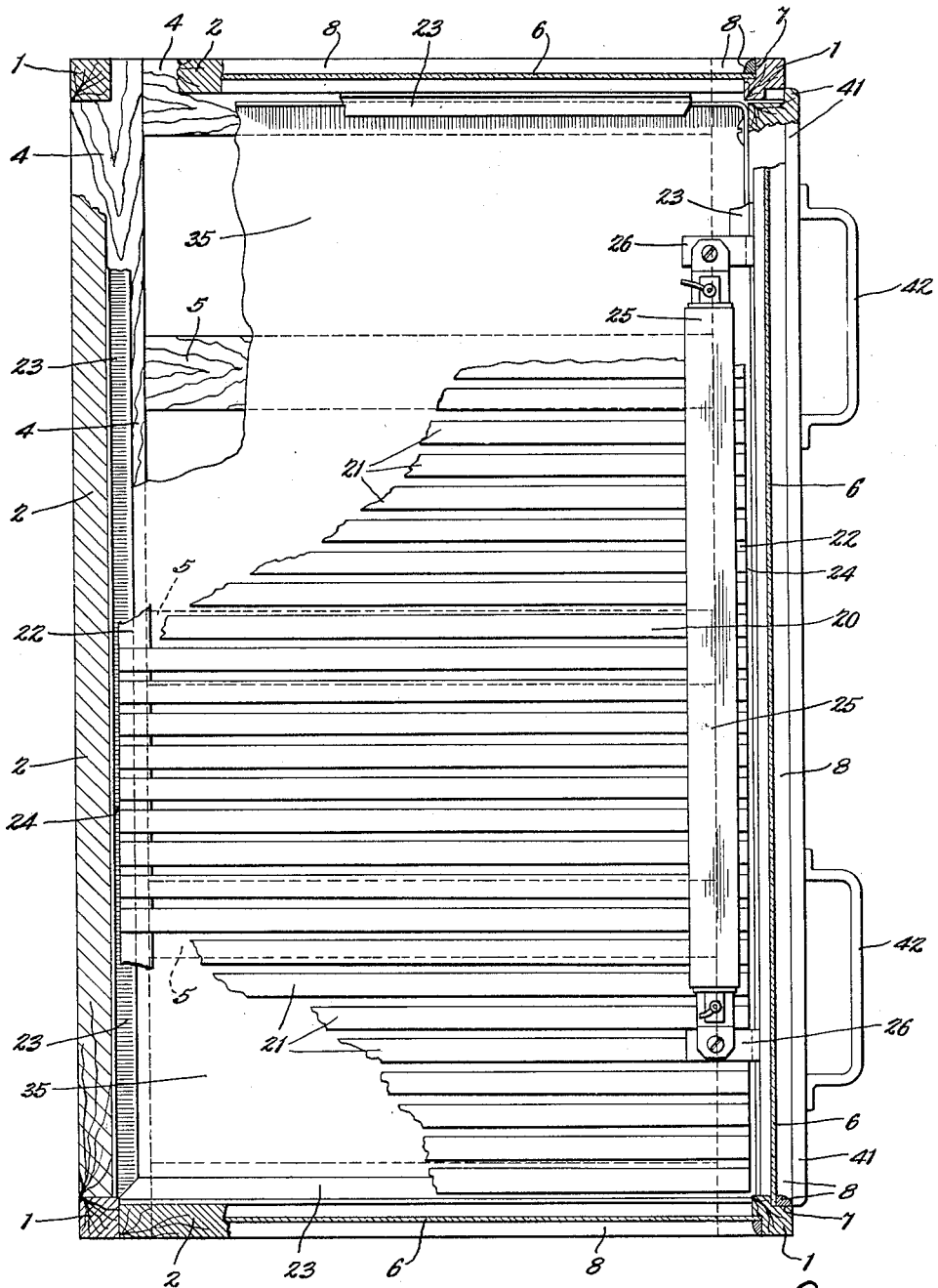

Patented Apr. 10, 1934

1,954,674

UNITED STATES PATENT OFFICE 1,954,674

MEANS FOR CULTIVATING PLANTS

John E. Lager, Summit, N. J.

Application April 4, 1932, Serial No. 602,898

1 Claim. (Cl. 47—17)

The invention relates to a novel and useful means for cultivating plants and more particularly to the growing and cultivation of orchids or other plants which obtain their nutriment solely or largely from the atmosphere.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a small scale elevation in perspective of an apparatus embodying the invention;

Fig. 2 is an enlarged view of a transverse vertical section of the apparatus shown in Fig. 1; and Fig. 3 is a transverse horizontal section taken on lines 3—3 of Fig. 2.

The invention is directed to a new and useful process and means for growing and cultivating plants, more particularly plants such as are commonly cultivated in floral greenhouses. The invention provides means for domestic cultivation of greenhouse flowers and the like whereby such plants and flowers may be grown in the home under all the conditions and regulations which are normally obtainable only in a large and expensive floral establishment. The invention also provides a novel process for enhancing the growth and cultivation of plants, more particularly such plants as orchids which derive their principal nutriment and moisture from the surrounding atmosphere.

More in particular, the invention is directed to providing a relatively small, compact and preferably portable chamber, container or structure adapted to act as a miniature greenhouse. Said container is provided with devices for maintaining the atmosphere within it at a predetermined and regulable temperature; for maintaining said atmosphere in a moist and humid condition; and for properly ventilating the enclosure. Furthermore, the structure and arrangement of the container and its included devices are designed with a view to convenience in using same, resupplying constituents of the process and the like, while the structure of the container is designed to present a neat and pleasing appearance and to display the plants or flowers therein to the best advantage.

In combination with the structural and mechanical advantages of the invention hereinbefore referred to, I provide a novel process for promoting the growth and cultivation of the plants in the container. Briefly, this process comprises the generation and/or introduction of carbon dioxide in the container whereby the plants will be provided with an atmosphere which is rich in carbon dioxide and therefore conducive to their rapid growth. The generation of the carbon dioxide preferably takes place in the presence of heat and moisture so that the atmosphere within the container is both warm, humid and high in carbonic content, thereby providing the most desirable conditions for growth of plants, particularly such plants as orchids which obtain their nutriment solely or largely from the atmosphere.

Referring now in detail to the present preferred embodiment of the invention, illustrated by way of example in the accompanying drawings, the invention provides a miniature greenhouse or hot house comprising a rectangular frame having vertical members 1, bottom side members 2 and top side members 3. The bottom comprises a rectangular frame 4 with spaced-apart cleats 5 extending transversely of the bottom frame. Panes of glass 6 are provided for the sides and ends of the greenhouse, being set in rabbets 7 in the outer faces of the frame members and held in place by molding strips 8, whereby said panes can be removed and replaced conveniently.

The greenhouse is so constructed or shaped that opening thereof, as for removal or insertion of plants, will occasion a minimum loss of the warm and humid atmosphere normally maintained therewithin. As embodied, the top of the greenhouse is sloped at a fairly steep angle so that the rear wall is considerably higher than the front and the frame 10 of the glazed cover 15 is hinged along the upper edge of said rear wall at 11. Thus the front edge 12 of the cover rests on the top of the front wall on a line substantially below the highest portion of the greenhouse and a pocket of warm air will be retained in the upper part of the chamber even when the lid is raised.

Means are provided for supporting plants in the lower part of the greenhouse, comprising a rack or grid 20 which is made up of spaced-apart slats 21 fixed to a rectangular frame 22. The frame 22 is adapted to rest a short distance above the bottom 5 of the greenhouse, being supported at a suitable level by angle members 23 fixed to the inner sides of the frame members 2. Preferably the frame 22 is slightly smaller than the interior dimensions of the supporting angle frame 23, leaving a slight space 24 whereby the angles 23 serve as gutters to catch condensed moisture from the upper portion of the greenhouse and direct same inwardly from the walls. It will be clear that the frame 20 is readily removable from its support and that it is adapted to permit circulation of air and other gases between the upper and lower portions of the greenhouse. As indicated in Fig. 2 a plurality of potted orchids or the like may be supported on the rack.

Means are provided for heating the interior of the greenhouse and for maintaining same at a predetermined and regulable temperature, said means comprisng a flat electric heating coil 25 supported on a bracket 26 on the front frame member 2. A thermostatic device 30 is provided for regulating the supply of current to the heating coil 25, said device being of any suitable known construction which is adapted to be set for a predetermined and regulable temperature. It will be noted that the location of the heating coil is such that dense cold air which enters the greenhouse upon lifting edge 12 of the cover will be most immediately and directly counteracted by the hot air rising from the heating coil, thereby providing a most efficient heating and circulating action.

The embodied means for creating and maintaining moisture in the greenhouse comprises a vessel 35 for holding any suitable amount of water which is adapted to evaporate and pass upwardly between the slats of rack 20 into the atmosphere surrounding the plants. As shown, the vessel 35 is preferably formed in the shape of a flat rectangular pan adapted to extend over the entire bottom 5 of the greenhouse, thereby providing a large evaporating surface for the water and effecting uniform distribution of vapor throughout the chamber.

The thermostat heating unit and water supply coact in a highly efficient manner to maintain the desired temperature and humidity in the greenhouse. The thermostatically controlled heater not only maintains the greenhouse at the desired temperature but also causes the water to evaporate. A dissemination of moisture and a recirculation thereof to the pan takes place automatically, especially at night time, when the humid air contacts with the cold glass surfaces and is condensed.

Referring now to that feature of the invention whereby carbon dioxide gas is created and introduced into the greenhouse, means are provided for electrolytically generating said gas by a very simple and inexpensive arrangement. As embodied, the vessel 35 is preferably composed of copper, or is copper lined. Pieces of coke, charcoal or other carboniferous material 36 are maintained in the bottom of the vessel in contact with the copper and partially immersed in the water. The copper and carbon apparently set up a slight electrolytic action which decomposes the water, the liberated oxygen combining with the carbon to form $CO_2$. This reaction is particularly well adapted for the purpose of the present invention in that no harmful gases or other substances are created, the liberated hydrogen being inert and harmless to the plants, while the $CO_2$ is, of course, a very valuable food, particularly for plants such as orchids which draw their nourishment wholly or largely from the atmosphere. Furthermore, the ingredients of the system are very inexpensive and easy to obtain and maintain. The operation as hereinbefore described is based upon my present observation and understanding thereof, but the invention is not limited to any particular theory of operation. So far as this aspect of the invention is concerned, it also will be understood that metals other than copper could and may be used for the electrolytic agent and that my invention broadly comprises any suitable mode and means for generating carbon dioxide in the miniature greenhouse. For most purposes it will be understood that the electrolytic reaction is preferable both because of its simplicity and harmless action and because the presence of moisture is desirable in any event.

The invention preferably provides means for removing the vessel of water so as to permit replacement and renovation of the ingredients in the tray 35. As embodied, the tray 35 is shaped to function as a removable drawer, the front side thereof being attached to a wooden member 40 which cooperates with the bottom of front frame member 2 so that the drawer may be pulled out, emptied and refilled, as will be clear from the drawings. Preferably member 40 is provided with a front guard member 41 which overlies the juncture between the edge of the frame member 2 and member 40, thereby sealing the space when the drawer is closed. Suitable handles 42 may be provided as indicated. Thus very simple and efficient means are provided for removing the tray and facilitating cleaning thereof. Deposits of copper, vegetable matter and the like gradually form on the lumps of coke 36 and it is occasionally desirable to remove same for cleaning, as well as to permit resupplying the water, etc.

The invention in its broader aspects is not limited to the specific mechanisms shown and described but departures may be made therefrom within the scope of the accompanying claim without departing from the principles of the invention and without sacrificing its chief advantages.

What I claim is:

A miniature greenhouse for plants including in combination a relatively small and portable glazed chamber, means for supporting one or more growing plants therein, means for maintaining the atmosphere within the chamber at a predetermined temperature, and a metal vessel below the plant-supporting means containing water and carbonaceous material.

JOHN E. LAGER.